United States Patent
Blair

(10) Patent No.: US 8,126,796 B2
(45) Date of Patent: Feb. 28, 2012

(54) SYSTEM AND METHOD FOR AUTOMATICALLY INVESTING A PORTION OF INTEREST CHARGED IN A MORTGAGE INSTALLMENT PAYMENT

(76) Inventor: Bryan Francis Blair, Mechanicville, NY (US)

(*) Notice: Subject to any disclaimer, the term of this patent is extended or adjusted under 35 U.S.C. 154(b) by 730 days.

(21) Appl. No.: 11/622,708

(22) Filed: Jan. 12, 2007

(65) Prior Publication Data

US 2008/0172345 A1    Jul. 17, 2008

(51) Int. Cl.
*G06Q 40/00* (2006.01)
(52) U.S. Cl. .......................... 705/36 R; 705/38
(58) Field of Classification Search .................. 705/35, 705/36, 38
See application file for complete search history.

(56) References Cited

U.S. PATENT DOCUMENTS

| | | | |
|---|---|---|---|
| 5,689,649 A * | 11/1997 | Altman et al. | 705/36 R |
| 5,787,404 A | 7/1998 | Fernandez-Holmann | |
| 5,852,811 A * | 12/1998 | Atkins | 705/36 R |
| 5,946,668 A | 8/1999 | George | |
| 6,070,153 A | 5/2000 | Simpson | |
| 2003/0225685 A1* | 12/2003 | Dickerson | 705/38 |
| 2007/0244777 A1* | 10/2007 | Torre et al. | 705/35 |
| 2009/0076948 A1* | 3/2009 | Dickerson | 705/38 |

OTHER PUBLICATIONS

Business and Industry 2011 Gale /Cengage (95528160) chapter 3 by Plunkett: Online Trading, Finance and Investment Web sites Almanac, pp. 50 Jan. 2000.*

* cited by examiner

*Primary Examiner* — Ella Colbert
*Assistant Examiner* — John Anderson
(74) *Attorney, Agent, or Firm* — GFD Patents LLC; Gerald F. Dudding

(57) ABSTRACT

A method and a system are provided to allocate a borrower's monthly home loan repayments to a loan provider to an interest payment account and an equity accrual account; and, to further allocate to a retirement or education account a monthly amount of savings that is correlated to that portion of each monthly home loan repayment comprising interest on the loan. The monthly amount of savings allocated to the retirement or education account is computed by multiplying that portion of each monthly home loan repayment comprising interest on the loan by a savings rate that is a function of an economic benchmark.

39 Claims, 1 Drawing Sheet

Figure 1:
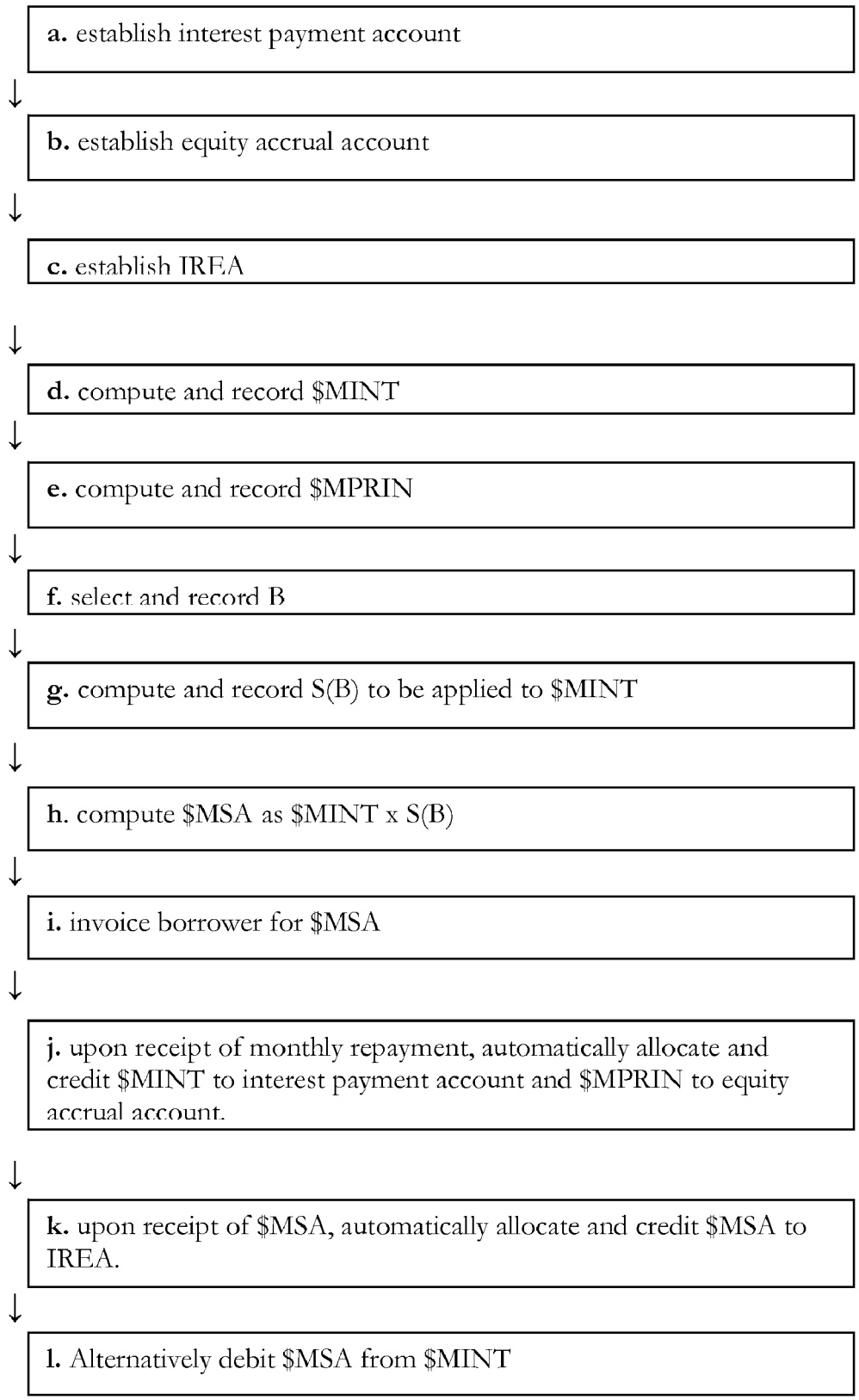

1
SYSTEM AND METHOD FOR AUTOMATICALLY INVESTING A PORTION OF INTEREST CHARGED IN A MORTGAGE INSTALLMENT PAYMENT

1. BACKGROUND OF THE INVENTION

1.1 Technical Field

The invention generally pertains to methods of investing; and in particular, to investing for retirement or an education concurrently with acquiring a personal residence.

2. Related Art

The acquisition of a home is a foundation of the "American Dream". Home purchases and the housing construction they stimulate are vital to the U.S. economy. The enjoyment of an adequate, if not prosperous, retirement is another aspect of the American Dream, and the sustenance of the growing population of senior citizens in the U.S. is a responsibility the government is struggling to meet.

Recently, increasing attention has been focused on the steady decline in savings by Americans and their poor state of preparedness for retirement. The economic and social gravity of the looming "Retirement Crisis" is compounded by the impending exhaustion of the Social Security system and the phasing out of pension plans by major corporate employers, especially those that call for employer contributions.

Accompanying these threats to retirement security is the problematic and relentless rise in the cost of a higher education.

Heretofore, funding the purchase of a home and funding retirement (or an education) have been viewed as independent financial goals, wherein the accomplishment of one may occur at the expense of the other, particularly as contributions to retirement from both government and the private sector become unreliable, insufficient, or nonexistent.

2.1 Summary of the Problem in the Prior Art

A problem faced by many Americans is achieving the goal of home ownership without sacrificing a secure retirement (or savings for a higher education); or, contrariwise, funding a secure retirement without sacrificing the benefits of home ownership.

Even for those Americans who can afford to meet both goals, retirement funding is threatened by a widespread loss of the discipline and commitment to consistently set aside savings for retirement throughout a working lifetime.

Financial institutions have been responsive to the needs and opportunities presented in the market for home ownership, on the one hand, and the needs and opportunities in the market for retirement funding, on the other. Competition has grown among financial institutions in both markets.

The advent of the Internet has intensified this competition by making the advantages and disadvantages of products sold in both markets more transparent, as exemplified, for example, by the comparison shopping for home mortgages provided by Lending Tree, LLC; and, for example, by the retirement planning systems and methodologies provided by FMR Corp., Scottrade, Inc., NewRetirement, LLC, and Ameriprise Financial, Inc., to name but a few.

Significantly, resources which provide information about mortgages and resources which provide information retirement planning refer to combining the two financial products. Indeed, a reverse mortgage—little more than a home equity loan for senior citizens—appears to be the only financial product to offer retirement income in the setting of existing home ownership, regrettably supplementing the former by devaluing the latter. The prevailing financial paradigm in the U.S. has consigned mortgage financing and retirement financing to distinct lines of commerce, each of which ignores the low rate of personal savings endemic in the U.S.

The present invention is responsive to the foregoing problem by providing loan providers and borrowers with systematic methods that promote the acceptance of loans secured by a mortgage and concurrently encourage borrowers to save and invest for retirement or a higher education.

3.0 SUMMARY OF THE INVENTION

The present invention provides a method and a system comprising a computer having a memory with associated data input/output and processing means, to allocate and credit a borrower's monthly home loan repayments to a loan provider to an interest payment account and an equity accrual account; and, to further allocate and credit to an individual retirement or education account ("IREA") a monthly amount of savings ("monthly savings amount" or "$MSA") that is correlated to that portion of each monthly home loan repayment comprising interest on the loan ("monthly interest payment" or "$MINT"). The monthly savings amount $MSA allocated and credited to the IREA is computed by multiplying the monthly interest payment $Mint by a savings rate ("S(B)") that is a function of at least one economic benchmark ("B"), such as, for example, the federal funds rate.

The method, which may be implemented by any loan provider and executed by the system, comprises:

a) establishing an interest payment account for the borrower;

b) establishing an equity accrual account for the borrower;

c) establishing an IREA for the borrower;

d) computing and recording the monthly interest payment $MINT;

e) computing and recording that portion of each monthly home loan repayment comprising repayment of principal ("monthly principle repayment" or "MPRIN");

f) selecting and recording the economic benchmark B;

g) computing and recording the savings rate S(B) to be applied to the monthly interest payment $MINT;

h) computing the monthly savings amount $MSA to be allocated and credited to the IREA by multiplying the monthly interest payment $MINT by the savings rate S(B);

i) invoicing the borrower for the monthly savings amount $MSA;

j) upon receipt by the loan provider from the borrower of the monthly home loan repayment, automatically allocating and crediting the monthly interest payment $MINT to the interest payment account; and, automatically allocating and crediting the monthly principal repayment $MPRIN to the equity accrual account;

k) upon receipt by the loan provider from the borrower of the monthly savings amount $MSA, automatically allocating and crediting the monthly savings amount $MSA to the IREA.

Alternatively the monthly savings amount $MSA may be debited from the monthly interest payment $MINT before it is allocated and credited to the interest payment account, and the debit may be allocated and credited to the IREA. In this case, the loan provider would recover the debit from management fees associated with the IREA.

The monthly interest payments should remain tax deductible and the capital appreciation in the traditional IRA is, by definition, tax-deferred.

3.1 Utility

The present invention is useful to consumers, particularly first-time home buyers, the federal government, and mortgage issuers.

3.1 Utility to Consumers

The present invention actualizes the concept of "invest for retirement as you acquire a home".

The present invention bestows upon consumers the tax benefits of home ownership together with the benefits of sustainable, automatic retirement savings. Because, most of the investment in a tax-deferred retirement fund based upon the interest payments occurs early in the life of the mortgage (nearly 50% within the first 10 years of a 30-year fixed rate mortgage), ample time is available for even a conservative investment to create compound gains in the retirement fund. As a first-time home buyer is typically in his or her early 30s, the long-term capital appreciation in the retirement fund—in conjunction with the equity built in the home (on average, inversely related to the amount of automatic retirement investment on a periodic basis)—will afford the home buyer a more stable and comfortable retirement than he or she is likely to have achieved without the present invention.

3.2 Utility to the Government

The retirement security provided by the present invention for Americans will be very attractive to the government, given the current crises over inadequate independent retirement savings, instability and elimination of corporate pension plans, and the under-funding of Social Security.

3.1 Utility to Loan Providers

In a competitive mortgage market, a mortgagee (loan provider) may wish to offer a potential mortgagor (borrower) an incentive for accepting a loan for the purchase of a home, by means of a system and method for financing a retirement or a college education. In a complementary fashion, a potential borrower may wish to establish a system for automatically investing for retirement or a college education concurrently with repayment of the mortgage-secured loan. Mortgage issuers are likely to attain greater market share by implementing and promoting the present invention, and can establish a new basis of profit through the expense ratio on their accounts.

The expense ratio measures a fund's operating expenses, expressed as a percentage of its average net assets. Funds with lower expense ratios are able to distribute a higher percentage of gross income returns to shareholders. More specifically, the expense ratio is the percentage of the assets that were spent to run, e.g., a mutual fund (as of its last annual statement). This includes expenses such as management and advisory fees, overhead costs and distribution and advertising fees. The expense ratio does not include brokerage costs for trading the portfolio, although these are reported as a percentage of assets to the SEC by the funds in a Statement of Additional Information (SAI). The SAI is available to shareholders on request. Fund expenses are also reflected in the fund's net asset value (NAV)—the market value of all securities owned by a mutual fund, minus its total liabilities, divided by the number of shares issued.

Accordingly, it is an objective of the present invention to provide a method and system for the repayment of a home loan secured by a mortgage that simultaneously funds an IREA.

4.0 BRIEF DESCRIPTION OF THE DRAWINGS

FIG. 1 is an operational flow chart of the system and method of the invention.

5.0 DETAILED DESCRIPTION OF THE INVENTION

Before the present invention is described, it is to be understood that this invention is not limited to the particular embodiments described, as these may, of course, vary. It is also to be understood that the terminology used herein is for the purpose of describing particular embodiments only, and is not intended to be limiting, because the scope of the present invention will be limited only by the appended claims.

5.1 Definitions 5.11 Benchmark Rate Definition

As used herein, the term "benchmark rate" or "economic benchmark" ("B") comprises any one or a combination of the following economic metrics:
   a) United States Federal Funds Rate;
   b) 5 Year United States Treasury Note Yield;
   c) 10 Year United States Treasury Note Yield;
   d) 30 Year United States Treasury Bond Yield;
   e) London Interbank Offered Rate;
   f) Mortgage-Backed Security Yield;
   g) National Average Mortgage Interest Rate 30 Year Fixed Rate Mortgage;
   h) National Average Mortgage Interest Rate 20 Year Fixed Rate Mortgage;
   i) National Average Mortgage Interest Rate 15 Year Fixed Rate Mortgage;
   j) National Average Mortgage Interest Rate 3/1 Adjustable Rate Mortgage;
   k) National Average Mortgage Interest Rate 5/1 Adjustable Rate Mortgage;
   l) National Average Mortgage Interest Rate 7/1 Adjustable Rate Mortgage;
   m) National Average Mortgage Interest Rate 7/1 Convertible Adjustable Rate Mortgage;
   n) National Average Mortgage Interest Rate Interest-only 30 Year Fixed Rate Mortgage;
   o) National Average Mortgage Interest Rate Interest-only 20 Year Fixed Rate Mortgage;
   p) National Average Mortgage Interest Rate Interest-only 15 Year Fixed Rate Mortgage;
   q) National Average Mortgage Interest Rate Interest-only 3/1 Adjustable Rate Mortgage;
   r) National Average Mortgage Interest Rate Interest-only 5/1 Adjustable Rate Mortgage;
   s) National Average Mortgage Interest Rate Interest-only 7/1 Adjustable Rate Mortgage;
   t) Regional, State, or Local Average Mortgage Interest Rate;
   u) Averages for 2/28 Adjustable Rate Mortgages (common offerings in the sub-prime mortgage market);
   v) State-sponsored mortgage interest rates, such as, for example, the State of New York Mortgage Agency Achieving the Dream Mortgage Program (SONYMA).

5.12 Loan Provider Definition

Mortgagees often sell off mortgage-secured loans as soon as possible after the loans have been made. Consequently, many mortgage-secured loans are administered by an entity or entities other that the lender, such as, for example, service institutions (loan servicers), intermediary institutions (loan intermediaries); and, as contemplated by this invention, a mortgage-secured loan may be made, administered, serviced or managed by a financial institution, such as, for example, a mutual fund, an index fund, or a retirement fund, or the like. Accordingly, as used herein, the term "loan provider" comprises any one or a combination of the aforementioned entities.

5.13 Other Definitions

As used herein and in the appended claims, the singular forms "a", "an", and "the" include plural referents unless the context clearly dictates otherwise. Thus, for example, reference to "an account" includes a plurality of such accounts, and so forth.

5.2 The Invention in Greater Detail

The present invention relates to a method and system of repayment of a home loan secured by a mortgage that simultaneously funds an individual retirement or education account ("IREA"), such as, for example, and without limitation:

A traditional Individual Retirement Account (IRA);
a Roth IRA;
a Spousal IRA;
a Group IRA;
an SEP IRA;
a SIMPLE IRA;
an Education IRA;
a 401 (K) Plan;
a 403(b) Plan;
a 457 Plan;
a Keogh Plan; or,
any other tax-free or tax-deferred investment account.

The present invention provides a method and a system comprising a computer having a memory with associated data input/output and processing means, to allocate and credit a borrower's monthly home loan repayments to a loan provider to an interest payment account and an equity accrual account; and, to further allocate and credit to the retirement or education account ("IREA") a monthly amount of savings ("monthly savings amount" or "$MSA") that is correlated to that portion of each monthly home loan repayment comprising interest on the loan ("monthly interest payment" or "$MINT"). The monthly savings amount $MSA allocated and credited to the IREA is computed by multiplying the monthly interest payment $MINT by a savings rate ("S(B)") that is a function of an economic benchmark ("B").

Referring now to FIG. 1, wherein steps appearing in boxes bear letter designations corresponding to the steps recited below, the method, which may be implemented by any loan provider and executed by the system, comprises:

a) establishing an interest payment account for the borrower;
b) establishing an equity accrual account for the borrower;
c) establishing an IREA for the borrower;
d) computing and recording the monthly interest payment $MINT;
e) computing and recording that portion of each monthly home loan repayment comprising repayment of principal ("$MPRIN");
f) selecting and recording the economic benchmark B;
g) computing and recording the savings rate S(B) to be applied to the monthly interest payment $MINT;
h) computing the monthly savings amount $MSA to be allocated and credited to the IREA by multiplying the monthly interest payment $Mint by the savings rate S(B);
i) invoicing the borrower for the monthly savings amount $MSA;
j) upon receipt by the loan provider from the borrower of the monthly home loan repayment, automatically allocating and crediting the monthly interest payment $MINT to the interest payment account; and, automatically allocating and crediting the monthly principal repayment $MPRIN to the equity accrual account;
k) upon receipt by the loan provider from the borrower of the monthly savings amount $MSA, automatically allocating and crediting the monthly savings amount $MSA to the IREA.

Alternatively the monthly savings amount $MSA may be debited from the monthly interest payment $MINT before it is allocated and credited to the interest payment account, and the debit may be allocated and credited to the IREA. In this case, the loan provider would recover the debit from management fees associated with the IREA.

For every month that the borrower makes monthly payments on the mortgage-secured home loan ("mortgage"), the monthly savings amount $MSA is computed by multiplying monthly interest payment $Mint on the mortgage by the savings rate S(B), so that:

$$\$MSA = S(B) \times \$MINT \qquad \text{[equation 1]}$$

In a first exemplary embodiment of the invention, the monthly savings amount $MSA that is invested in the IREA by the loan provider on behalf of the borrower is computed from one of the foregoing Benchmark Rates B as follows.

Initially, a Benchmark Rate B is selected.

The selected Benchmark Rate B is augmented by an amount ΔB to form an augmented Benchmark Rate $B_A$ so that:

$$B_A = B + \Delta B \qquad \text{[equation 2]}$$

The savings rate S(B) is calculated as the difference between the applicable interest rate on the mortgage ("A") and $B_A$, divided by the applicable interest rate on the mortgage A, so that $$S(B) = (A - B_A)/A \qquad \text{[equation 3]}$$

The monthly savings amount $MSA to be invested in the IREA is the product of S(B) and the monthly interest payment $MINT, so that $$\$MSA = [(A - B_A)/A] \times \$MINT \qquad \text{[equation 4]}$$

For example if:
the applicable interest rate on the mortgage A is taken as 6.30%; and,
A is applied to a 30-yr fixed rate mortgage ("FFM") of $200,000; and,
a federal funds rate ("FFR") of 5.25% is selected as the Benchmark Rate B, so that B=FFR; and,
the federal funds rate FFR of 5.25% is augmented by an amount ΔB=ΔFFR=0.50% to yield an augmented federal funds fate of $FFR_A$=FFR+ΔFFR=5.25%+0.50%=5.75%, then the savings rate is:

$$S(FFR) = [(A - FFR_A)/A] = (6.30\% - 5.75\%)/6.30\% = 8.7\% \qquad \text{[equation 5]}$$

And, the monthly savings amount is:

$$\$MSA = [(A - FFR_A)/A] \times \$MINT = 8.7\% \times \$MINT \qquad \text{[equation 6]}$$

A mortgage payment calculator computes a monthly installment payment of $1237.50 for a 30-yr FRM of $200, 000 at 6.30%, of which, in the first month of repayment, $187.95 represents repayment of principal and $1050.00 is interest. Accordingly the monthly savings amount for the first month of repayment is $$\$MSA=8.7\%\times\$1050.00=\$91.35 \qquad \text{[equation 7]}$$

Using the foregoing exemplary figures, the average monthly savings amount to be allocated and credited to the IREA would be $85.00 over the first ten years of loan repayment.

Where, as here, the benchmark rate B is the federal funds rate FFR, equation 1 bears a rational relationship to the state of the U.S. economy and keeps the monthly savings amount $MSA tied to the state of the U.S. economy and the correlative ability of the borrower to invest for retirement.

If, on the one hand, the Federal Open Market Committee (FOMC) lowers the federal funds rate FFR in an effort to stimulate economic growth, the savings rate S(B) declines and the monthly savings amount $MSA declines, in keeping with a prevailing sluggish economy.

If, on the other hand, the FOMC raises the federal funds rate FFR in an effort to moderate economic growth, the savings rate S(B) rises and the monthly savings amount $MSA increases, in keeping with a prevailing robust economy.

In a second exemplary embodiment of the invention, the monthly savings amount $MSA that is invested in the IREA by the loan provider on behalf of the borrower is again computed from one of the foregoing Benchmark Rates b as follows.

Initially, a Benchmark Rate B is selected.

The selected Benchmark Rate B is augmented by a premium $\Delta B$ to form an Augmented Benchmark Rate $B_A$ so that:

$$B_A=B+\Delta B \qquad \text{[equation 8]}$$

The savings rate S(B) is calculated as the difference between the Augmented Benchmark Rate $B_A$ and B, divided by the Augmented Benchmark Rate $B_A$, so that:

$$S(B)=(B_A-B)/B_A \qquad \text{[equation 9]}$$

The monthly savings amount $MSA to be invested in the IREA is the product of S(B) and the monthly interest payment $MINT, so that $$\$MSA=[(B_A-B)/B_A]\times\$MINT \qquad \text{[equation 10]}$$

For example if: the Benchmark Rate B is taken as the federal funds rate at 5.25% (plus a management or servicing fee of 0.50%)
so that B=FFR=5.75%; and,
the premium $\Delta FFR$ is 1.5%;
then the augmented federal funds rate $FFR_A$=FFR+$\Delta FFR$= 5.75%+1.50%=7.25%; and,
the savings rate is:

$$S(FFR)=[FFR_A-FFR)/FFR_A]=(7.25\%-5.75\%)/7.25\%=20.6\% \qquad \text{[equation 11]}$$

Accordingly, the monthly savings amount is:

$$\$MSA=[FFR_A-FFR)/FFR_A]\times\$MINT=20.6\%\times\$MINT \qquad \text{[equation 12]}$$

A mortgage calculator computes a monthly installment payment of $1364.35 for a 30-yr FRM of $200,000 at 7.25%, of which, in the first month of repayment, $156.02 represents repayment of principal and $1208.33 is interest. Applying equation 11 or 20.6% to the interest portion of $1208.33, yields $248.92, i.e., $$\$MSA=20.6\%\times\$1208.33=\$248.92 \qquad \text{[equation 13]}$$

Using the foregoing exemplary calculations, the average monthly savings amount to be allocated and credited to the IREA would be $234.05 over the first ten years of loan repayment.

Again, as explained supra, with the benchmark rate b as the federal funds rate, equation 10 bears a rational relationship to the state of the U.S. economy and keeps the monthly savings amount $MSA tied to the state of the U.S. economy and the correlative ability of the borrower to invest for retirement.

In a preferred third exemplary embodiment of the present invention, two Benchmark Rates are selected. The first Benchmark Rate $B_1$ is a representative State of New York Mortgage Agency ("SONYMA") Achieving the Dream Mortgage Program rate. The second Benchmark Rate $B_2$ is a representative National Average Mortgage Interest Rate ("NAMIR") (that brings the borrower's monthly payments to the equivalent of what would be paid under the current national average mortgage interest rate for the same principal amount on the loan).

The savings rate S(B) is calculated as the difference between the second Benchmark Rate $B_2$ and the first Benchmark Rate $B_1$, divided by the second Benchmark Rate $B_2$, so that:

$$S(B_1, B_2)=(B_2-B_1)/B_2 \qquad \text{[equation 14]}$$

The monthly savings amount $MSA to be invested in the IREA is the product of $S(B_1, B_2)$ and the monthly interest payment $MINT, so that $$\$MSA=[(B_2-B_1)/b_2]\times\$MINT \qquad \text{[equation 15]}$$

Accordingly:

With the first Benchmark Rate $B_1$ taken as the current (December 2006) SONYMA rate of 5.25%; and,
the second Benchmark Rate $B_2$ taken as the current (December 2006) NAMIR rate of 6.29%;
then the savings rate is:

$$S(B_1, B_2)=(B_2-B_1)/B_2=(NAMIR-SONYA)/NAMIR=1.04/6.29=(6.29\%-5.25\%)/6.29\%=16.53\% \qquad \text{[equation 16]}$$

Again, the monthly savings amount is:

$$\$MSA=[(NAMIR-SONYA)/NAMIR]\times\$MINT=16.53\%\times\$MINT \qquad \text{[equation 17]}$$

For a 30-yr FRM of $200,000 at 7.25%, a mortgage calculator computes the following:
Years 1-5: 50,563.42×0.1653=$8,358.13 invested (average monthly savings amount=$139.30);
Years 6-10: 45,862.03×0.1653=$7,580.99 invested (average monthly savings amount=$126.35);
Years 11-15: 39,752.88×0.1653=$6,571.15 invested (average monthly savings amount=$109.52);
Years 16-20: 31,744.47×0.1653=$5,247.36 invested (average monthly savings amount=$87.46);
Years 21-25: 21,499.04×0.1653=$3,553.78 invested (average monthly savings amount=$59.22);
Years 26-30: 8,094.83×0.1653=$1,338.08 invested (average monthly savings amount=$22.30).

Operationally, a loan provider would set up and operate the present invention as follows:
a) The loan provider would solicit a loan application through a marketing program for a mortgage-secured loan combined with an IREA;
b) Potential borrowers would complete application documentation for both the mortgage-secured loan and the IREA, and return them to the loan provider.

c) Account records would be set up for the loan account and the coupled IREA. Databases associated with the loan and the IREA would be linked and cross-referenced by account numbers.

d) Account management systems would be established to monitor the payment status of the loan and the allocation and credit of the monthly savings amount to the IREA.

A potential borrower applies for a mortgage-secured home loan+IREA by filling out and returning applications therefore. The mortgage-secured home loan application contains all customary required disclosures, such as finance charges, fees, etc. Simultaneously with the mortgage-secured home loan application, the potential borrower fills out an IREA application and a management agreement appropriate to an elected form of IREA, which contains the agreement on behalf of the potential borrower to a custodial relationship, and to any set-off or account invasion rights of the loan provider in the event of a loan default.

The IREA application would also require the potential borrower to select an investment fund, such as, for example, a blue chip stock fund, index fund, municipal bond fund, etc., and to agree to any optional additional monthly investments.

If the application for the mortgage-secured home loan is denied, the loan application process is terminated, but the potential borrower is still sent information about an IREA and offered the opportunity to save for retirement independently of acquiring a home.

If the mortgage-secured home loan+IREA application is approved, the foregoing accounts would be established by the loan provider on behalf of the borrower.

Upon receipt of the mortgage-secured home loan the borrower begins to repay the loan and concurrently fund the IREA.

Each month, the borrower will be able to evaluate activity in the IREA.

At the end of a calendar year, the borrower is notified of amounts that may still be allocated and credited to the IREA according to applicable time limits (e.g., April 15th of the following year for IRAs) and funding limits (e.g., $2,000.00 for Regular or Spousal IRAs; $500.00 per child for Educational IRAs) established by the Federal Government.

The borrower may also make deposits directly into the IREA.

Although coupled, loan account and IREA remain separate and distinct accounts for each borrower. They may be held and/or serviced by different entities or the same entity. A borrower may close the IREA and remain responsible for repayment of the mortgage-secured home loan.

Service or custodial fees would be charged by the IREA custodian—depending upon the type and balance of the account.

In a method and system such as this, tax implications may arise. Profitability for loan providers will differ depending upon the loan provider, its market position, and other factors.

While the invention has been disclosed in connection with the embodiments depicted herein, it will be apparent to one of ordinary skill in the art that various modifications and substitutions may be made to these embodiments without departing in any way from the scope of the invention as defined in the following claims. While the present invention has been described herein by the preferred embodiment, it will be understood by those skilled in the art that various changes may be made and added to the process. These changes and alternatives are considered to be within the spirit and scope of the present invention.

While the present invention has been illustrated by description of an embodiment and while the illustrative embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method and illustrative example shown and described. Accordingly, departures may be made from such details without departing from the spirit or scope of the applicant's general inventive concept.

I claim:

1. A method for repayment of a home loan secured by a mortgage that simultaneously funds an investment account, comprising:
providing a computer having a memory with associated data input/output and processing means for allocating and crediting a borrowner's monthly home loan repayments to the loan provider to an interest repayment account and an equity account and for allocating and crediting to the investment account a monthly savings amount $MSA that is computed by multiplying a monthly interest payment $MINT by a savings rate S(B) that is a function of at least one economic benchmark rate (B), according to the following equation(1):

$$\$MSA = S(B) \times \$MINT \qquad \text{(equation 1)}.$$

2. The method according to claim 1, wherein the investment account is a traditional Individual Retirement Account (IRA).

3. The method according to claim 1, wherein the investment account is a Roth IRA.

4. The method according to claim 1, wherein the investment account is a Spousal IRA.

5. The method according to claim 1, wherein the investment account is a Group IRA.

6. The method according to claim 1, wherein the investment account is an SEP IRA.

7. The method according to claim 1, wherein the investment account is a SIMPLE IRA.

8. The method according to claim 1, wherein the investment account is an Education IRA.

9. The method according to claim 1, wherein the investment account is a 401 (K) Plan.

10. The method according to claim 1, wherein the investment account is a 403(b) Plan.

11. The method according to claim 1, wherein the investment account is a 457 Plan.

12. The method according to claim 1, wherein the investment account is a Keogh Plan.

13. The method according to claim 1, wherein the savings rate S(B) is a function of a benchmark rate B and an applicable interest rate A on the mortgage.

14. The method according to claim 13, wherein the benchmark rate B is selected from the group consisting of
a) United States Federal Funds rate,
b) 5 Year United States Treasury Note yield,
c) 10 Year United States Treasury Note yield,
d) 30 Year United States Treasury Bond yield,
e) London Interbank Offered rate,
f) Mortgage-Backed Security yield,
g) National Average Mortgage Interest Rate 30 Year Fixed Rate Mortgage,
h) National Average Mortgage Interest Rate 20 Year Fixed Rate Mortgage,
i) National Average Mortgage Interest Rate 15 Year Fixed Rate Mortgage, j) National Average Mortgage Interest Rate 3/1 Adjustable Rate Mortgage,
k) National Average Mortgage Interest Rate 5/1 Adjustable Rate Mortgage,
l) National Average Mortgage Interest Rate 7/1 Adjustable Rate Mortgage,
m) National Average Mortgage Interest Rate 7/1 Convertible Adjustable Rate Mortgage,
n) National Average Mortgage Interest Rate Interest-only 30 Year Fixed Rate Mortgage,
o) National Average Mortgage Interest Rate Interest-only 20 Year Fixed Rate Mortgage,
p) National Average Mortgage Interest Rate Interest-only 15 Year Fixed Rate Mortgage,
q) National Average Mortgage Interest Rate Interest-only 3/1 Adjustable Rate Mortgage,
r) National Average Mortgage Interest Rate Interest-only 5/1 Adjustable Rate Mortgage,
s) National Average Mortgage Interest Rate Interest-only 7/1 Adjustable Rate Mortgage,
t) Regional, State, or Local Average Mortgage Interest Rate,
u) Averages for 2/28 Adjustable Rate Mortgages, and
v) State-sponsored mortgage interest rates.

15. The method of claim 13, wherein the savings rate is calculated as the difference between a second Benchmark Rate $B_2$ and a first Benchmark Rate $B_1$, divided by the second Benchmark Rate $B_2$, according to equation (14):

$$S(B_1, B_2) = (B_2 - B_1)/B_2 \qquad \text{(equation 14)}.$$

16. The method of claim 14, wherein the selected benchmark rate B is augmented by a premium $\Delta B$ to form an augmented benchmark rate $B_A$, according to the following equation (8):

$$B_A = B + \Delta B \qquad \text{(equation 8)}.$$

17. The method of claim 16, wherein the savings rate S(B) is computed by the processing means to be the ratio obtained when the difference between the applicable interest rate A on the mortgage and the augmented benchmark rate $B_A$ is divided by the applicable interest rate A on the mortgage, according to the following equation (3):

$$S(B) = (A - B_A)/A \qquad \text{(equation 3)}.$$

18. The method of claim 16, wherein the savings rate is computed by the processing means to be the ratio obtained when the difference between the augmented benchmark rate and the benchmark rate is divided by the augmented benchmark rate, according to the following equation (9):

$$S(B) = (B_A - B)/B_A \qquad \text{(equation 9)}.$$

19. The method of claim 1, comprising:
a) establishing an interest payment account for the borrower;
b) establishing an equity accrual account for the borrower;
c) establishing an investment account for the borrower;
d) computing and recording the monthly interest payment $MINT;
e) computing and recording that portion of each monthly home loan repayment comprising the monthly principle repayment $MPRIN;
f) selecting and recording the economic benchmark rate (B);
g) computing and recording the savings rate S(B) to be applied to the monthly interest payment $MINT;
h) computing the monthly savings amount $MSA to be allocated and credited to the investment account by multiplying the monthly interest payment $MINT by the savings rate S(B);
i) invoicing the borrower for the monthly savings amount $MSA;
j) upon receipt by the loan provider from the borrower of the monthly home loan repayment, automatically allocating and crediting the monthly interest payment $MINT to the interest payment account; and, automatically allocating and crediting the monthly principal repayment $MPRIN to the equity accrual account;
k) upon receipt by the loan provider from the borrower of the monthly home loan repayment, automatically debiting the monthly savings amount $MSA from the monthly interest payment $MINT and allocating the monthly savings amount $MSA to the investment account; and thereafter automatically allocating and crediting the remaining monthly interest payment $MINT to the interest payment account and the monthly principle repayment $MPRIN to the equity accrual account.

20. The method of claim 1, wherein the investment account is an individual retirement or education account.

21. A system for repayment of a home loan secured by a mortgage that simultaneously funds an investment account, comprising:
a computer having a memory with associated data input/output and a processing means for allocating and crediting a borrowner's monthly home loan repayments to the loan provider to an interest repayment account and an equity account, and for allocating and crediting to an investment account a monthly savings amount $MSA that is computed by multiplying a monthly interest payment $MINT by a savings rate S(B) that is a function of at least one economic benchmark rate, according to the following equation(1):

$$\$MSA = S(B) \times \$MINT \qquad \text{(equation 1)}.$$

22. The system according to claim 21, wherein the investment account is a traditional Individual Retirement Account (IRA).

23. The system according to claim 21, wherein the investment account is a Roth IRA.

24. The system according to claim 21, wherein the investment account is a Spousal IRA.

25. The system according to claim 21, wherein the investment account is a Group IRA.

26. The system according to claim 21, wherein the investment account is an SEP IRA.

27. The system according to claim 21, wherein the investment account is a SIMPLE IRA.

28. The system according to claim 21, wherein the investment account is an Education IRA.

29. The system according to claim 21, wherein the investment account is a 401 (K) Plan.

30. The system according to claim 21, wherein the investment account is a 403(b) Plan.

31. The system according to claim 21, wherein the investment account is a 457 Plan.

32. The system according to claim 21, wherein, the investment account is a Keogh Plan.

33. The system according to claim 21, wherein the savings rate S(B) is a function of a benchmark rate (B) and an applicable interest rate or a premium.

34. The system according to claim 33, wherein the benchmark rate is selected from the group consisting of a) United States Federal Funds rate,
b) 5 Year United States Treasury Note yield,
c) 10 Year United States Treasury Note yield,
d) 30 Year United States Treasury Bond yield,
e) London Interbank Offered rate,
f) Mortgage-Backed Security yield,
g) National Average Mortgage Interest Rate 30 Year Fixed Rate Mortgage,
h) National Average Mortgage Interest Rate 20 Year Fixed Rate Mortgage,
i) National Average Mortgage Interest Rate 15 Year Fixed Rate Mortgage,
j) National Average Mortgage Interest Rate 3/1 Adjustable Rate Mortgage,
k) National Average Mortgage Interest Rate 5/1 Adjustable Rate Mortgage,
l) National Average Mortgage Interest Rate 7/1 Adjustable Rate Mortgage,
m) National Average Mortgage Interest Rate 7/1 Convertible Adjustable Rate Mortgage,
n) National Average Mortgage Interest Rate Interest-only 30 Year Fixed Rate Mortgage,
o) National Average Mortgage Interest Rate Interest-only 20 Year Fixed Rate Mortgage,
p) National Average Mortgage Interest Rate Interest-only 15 Year Fixed Rate Mortgage,
q) National Average Mortgage Interest Rate Interest-only 3/1 Adjustable Rate Mortgage,
r) National Average Mortgage Interest Rate Interest-only 5/1 Adjustable Rate Mortgage,
s) National Average Mortgage Interest Rate Interest-only 7/1 Adjustable Rate Mortgage,
t) Regional, State, or Local Average Mortgage Interest Rate,
u) Averages for 2/28 Adjustable Rate Mortgages, and
v) State-sponsored mortgage interest rates.

35. The system of claim 33, wherein the savings rate S(B) is computed by the ratio obtained when the difference between an applicable interest rate and the benchmark rate B is divided by the applicable interest rate.

36. The system of claim 33, wherein a premium is added to the benchmark rate B to form an augmented benchmark rate $B_A$, and the savings rate S(B) is computed by the ratio obtained when the difference between the augmented benchmark rate $B_A$ and the benchmark rate B is divided by the augmented benchmark rate $B_A$.

37. The system of claim 33, wherein the savings rate S(B) is calculated as the difference between a second Benchmark Rate $B_2$ and a first Benchmark Rate $B_1$, divided by the second Benchmark Rate $B_2$.

38. The system of claim 21, comprising:
an interest payment account for the borrower;
an equity accrual account for the borrower; and
an investment account for the borrower,
wherein the processing means computes and records the monthly interest payment $MINT;
wherein the processing means computes and records that portion of each monthly home loan repayment comprising the monthly principle repayment $MPRIN,
wherein the processing means selects and records the economic benchmark rate B,
wherein the processing means computes and records the savings rate S(B) to be applied to the monthly interest payment $MINT,
wherein the processing means computes the monthly savings amount $MSA to be allocated and credited to the investment account by multiplying the monthly interest payment $MINT by the savings rate S(B);
wherein the borrower is invoiced for the monthly savings amount $MSA,
wherein upon receipt by the loan provider from the borrower of the monthly home loan repayment, the processing means automatically allocates and credits the monthly interest payment $MINT to the interest payment account; and, automatically allocates and credits the monthly principal repayment $MPRIN to the equity accrual account;
wherein upon receipt by the loan provider from the borrower of the monthly home loan repayment, the processing means automatically debits the monthly savings amount $MSA from the monthly interest payment $MINT and allocates the monthly savings amount $MSA to the investment account; and thereafter automatically allocates and credits the remaining monthly interest payment $MINT to the interest payment account and the monthly principal repayment $MPRIN to the equity accrual account.

39. The system of claim 21, wherein the investment account is an individual retirement or education account.

* * * * *